United States Patent [19]
Horberg, Jr. et al.

[11] 3,768,948
[45] Oct. 30, 1973

[54] BLOW MOLD

[75] Inventors: Charles Horberg, Jr., Northbrook; Richard K. Shelby, Hinsdale, both of Ill.

[73] Assignee: Monsanto Company, St. Louis, Mo.

[22] Filed: Dec. 20, 1971

[21] Appl. No.: 209,600

[52] U.S. Cl............ 425/387, 249/79, 425/DIG. 208
[51] Int. Cl............................................. B29d 23/03
[58] Field of Search.................... 425/387, 326, 324, 425/DIG. 58, 342, 243, 249, 296, 297, 310; 249/79

[56] References Cited
UNITED STATES PATENTS

| | | | |
|---|---|---|---|
| 3,097,398 | 7/1963 | Inglesby | 425/387 X |
| 3,363,282 | 1/1968 | Hagen | 425/387 X |

*Primary Examiner*—J. Spencer Overholser
*Assistant Examiner*—Michael O. Sutton
*Attorney*—James C. Logomasini et al.

[57] ABSTRACT

A blow mold having high heat transfer capacity which includes carrier supported shells with cavity portions defining the article shape, each shell having the fins on its back surface extending toward its carrier, and a backing member intermediate each carrier and shell which closes the front of the grooves between the fins to form heat transfer channels on the back of each shell, the backing member being contoured to direct fluid to and away from the channels in a streamlined fashion. The mold is formed by milling grooves in the back surface of a formed shell, assemblying the shell to the carrier with the grooves spaced from and facing the carrier and with contoured filler blocks in place at opposite ends of the space, filling the remaining space between the carrier and shell with the backing member without completely filling the grooves and then removing the blocks leaving voids defining manifolds communicating with the ends of the grooves.

11 Claims, 7 Drawing Figures

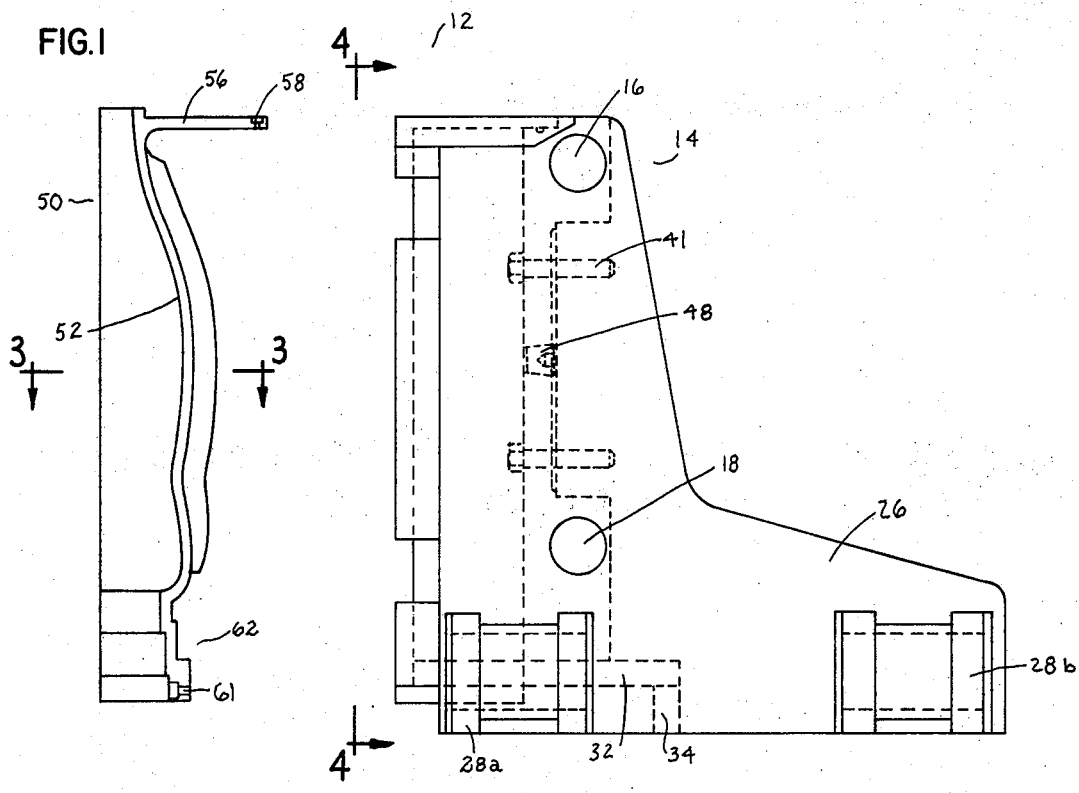
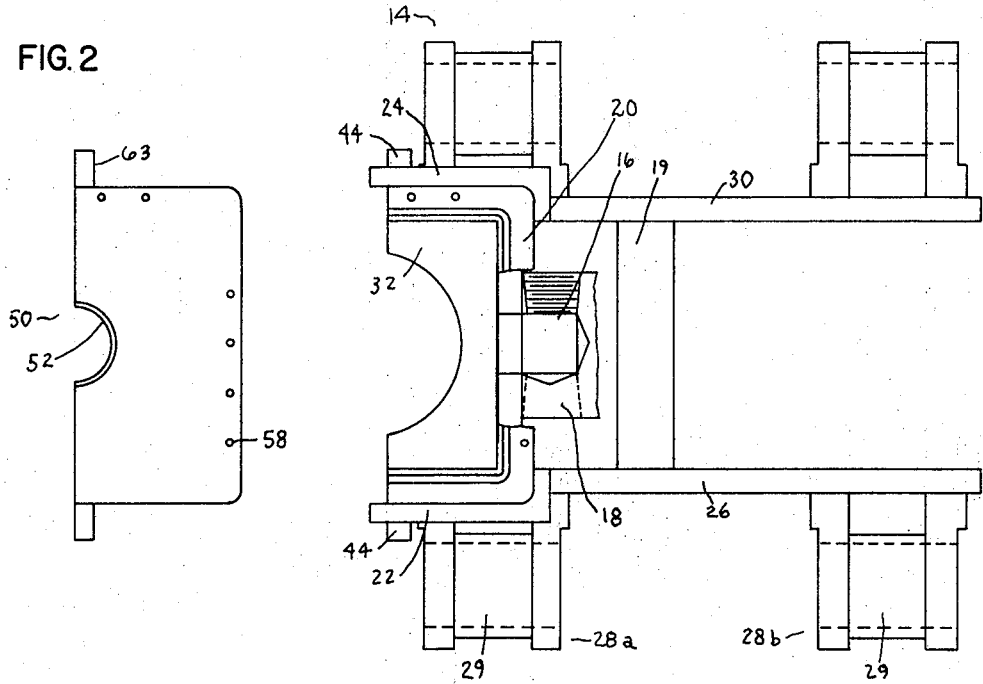

INVENTORS
CHARLES HORBERG
RICHARD K. SHELBY
BY
Michael J. Murphy
ATTORNEY

PATENTED OCT 30 1973 3,768,948

INVENTORS
CHARLES HORBERG
RICHARD K. SHELBY
BY Michael J. Murphy
ATTORNEY

3,768,948

BLOW MOLD

CROSS REFERENCE TO ASSOCIATED APPLICATIONS

U.S. application Ser. No. 198,246, filed Nov. 12, 1971, entitled "Improved Blow Molding Apparatus" by Charles Horberg, Jr. and Richard K. Shelby illustrates an environment in which the instant invention may be employed.

BACKGROUND OF THE INVENTION

This invention relates to molds and more particularly to blow molds having high heat transfer capacity and to a method of fabricating same.

In view of ever increasing competitive conditions in the marketplace today, a continuing need exists for high speed blow molding equipment for forming hollow articles from tubular sections of thermoplastic material. A known approach to a multiple installation, minimum cost, large volume, blow molding facilities network has been the so called two step process where preforms, either closed or open ended, are shaped at one or more central locations where relatively expensive, technically sophisticated, heavy duty extrusion equipment is housed, and the preforms then shipped to various remote satellite plants where they are blow molded into the final article configurations. With this approach, the key equipment components at such satellite facilities may be kept at a minimum and usually need only include some means for reheating the preforms to molding temperature plus one or more blow molding stations capable of forming an article relatively rapidly, e.g., on the order of a few seconds or less. With such especially high production rates, the molded articles, when in the form of containers such as bottles, can be fed directly to a high speed automated container filling line at a rate approximately corresponding to the usual capacity of such a line, thus providing overall, a highly integrated system.

Needless to say, the heat necessarily present in the plastic to render it sufficiently pliable for expanding it outwardly against the mold surfaces to form the articles must be removed rapidly if the economics of such a system are to be fully realized, since the plastic must be set sufficiently such that the articles will not permanently deform on removal from the mold. This requirement means that the blow mold must have a high heat transfer rate.

It has been the well established practice in the past to form as many internal channels in each blow mold section as structurally feasible for passage of a cooling medium therethrough to conductively reduce the temperature of the surface of the forming cavity and therefore of the plastic which is in forced contact with it. However, for extremely high production rates, the heat transfer rate of such molds is just not sufficient to reduce the plastic temperature sufficiently rapidly as to keep up with the capacity of other components of the forming system. In U. S. Pat. No. 3,097,398, it has been proposed to directly expose the blow mold to a cooled bath held by a shell in which the mold is mounted. Though such construction represents an advance in the right direction, the heat transfer medium in contact with the mold is relatively stagnant and is itself cooled by circulating an auxiliary coolant through a coil immersed in the bath. Such stagnation does not provide the optimum in heat transfer rate and can produce dead spots in the mold coolant medium thus promoting undesirable, uneven heat transfer from the plastic.

SUMMARY OF THE INVENTION

Now, however, there has been developed a blow mold capable of an extremely high rate of heat transfer with respect to a plastic article within its forming cavity.

Accordingly it is a principal object of this invention to provide improved blow mold structure.

It is an additional object of this invention to provide a blow mold having improved structure for facilitating a high rate of heat removal.

Another object of this invention is to increase the surface available in a blow mold for transferring heat out of the plastic expanded therein.

A specific object of this invention is to provide a blow mold wherein the surface against which the plastic is blown is extended in order to improve the rate of heat transfer through it.

A further object of this invention is to provide a blow mold of the aforementioned variety for use in a blow molding system capable of cycling at very high speeds.

Another object of this invention is to provide a method of forming a blow mold having the aforementioned characteristics.

other objects of this invention will in part be obvious and will in part appear hereinafter.

These and other objects are accomplished by providing a mold for shaping blown hollow plastic articles which comprises carrier members having heat transfer fluid inlet and outlet openings, mold shell portions secured to the carrier members having interior surfaces forming a cavity conforming to the shape of the articles when the mold is in closed position, each shell portion having fins projecting from its outer surface toward the carrier member in which it is secured, a filler block engaged with wall portions of each carrier member and end portions of the fins forming with said fins channels for passage of the heat transfer fluid therethrough, the filler blocks forming contoured manifolds communicating with the openings in the carrier members and with the ends of the channels for directing the heat transfer fluid to and removing it from opposite ends of the channels. The filler block is preferably a metal alloy having a relatively low melting point which expands on cooling.

A method is provided for forming such a mold which comprises the steps of forming a shell mold, milling grooves in the back of such mold, shaping solid forms having predetermined outer contours defining the outline of manifolds for communicating with the ends of the grooves when the mold is assembled in final form, securing the shell mold to a carrier member with the grooves opening toward and spaced from the wall of the carrier member and the forms positioned between the mold and carrier member at opposite ends of the space, filling the space between the carrier member and shell mold with a backing substance without completely filling the grooves and then removing the solid forms whereby a mold is produced having contoured supply and discharge manifolds communicating with heat transfer medium passages therein.

During fabrication of the blow mold, filling is preferably accomplished by pouring the backing substance in liquid form into the space between the carrier member and the walls of the grooves and then allowing the liquid backing substance to cool and solidify. The grooves are preferably initially formed to the desired final depth and temporarily substantially filled with a material such as plaster of paris in order to prevent the backing substance from flowing deeply into the grooves when poured into the space between the carrier and shell. After the backing substance has hardened, the assembly is dismantled and this filling material removed from the grooves to form the open channels. On reassembly, the mold is ready for use.

BRIEF DESCRIPTION OF THE DRAWINGS

In describing the overall invention, reference will be made to the accompanying drawings wherein:

FIG. 1 is a front, elevational view of a mold embodying the present invention with parts separated;

FIG. 2 is a plan view of FIG. 1, partly in section;

DETAILED DESCRIPTION OF THE ILLUSTRATED EMBODIMENTS

Figure 5:
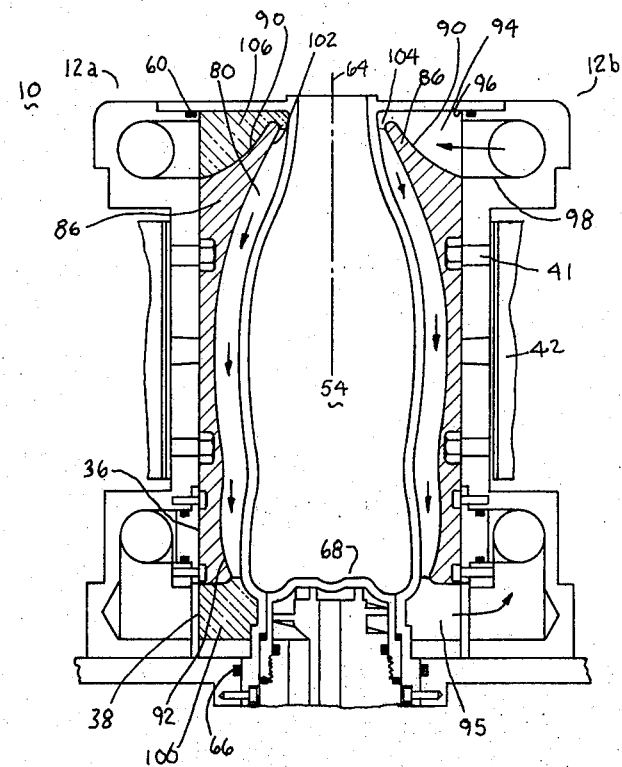
FIG. 5 is a partial, elevational, schematic view of the apparatus of FIG. 1 in fully assembled form.

Referring now to the drawings, there is illustrated in FIG. 5, a mold 10 for shaping blown hollow plastic articles. Mold 10 may be used in conjunction with the apparatus components described and illustrated in our aforesaid copending application Ser. No. 198,246, filed Nov. 12, 1971 or alternatively in any other blow molding system. Mold 10 comprises identical opposing portions 12a and 12b, only one of which will be described hereafter in more detail.

Figure 4:
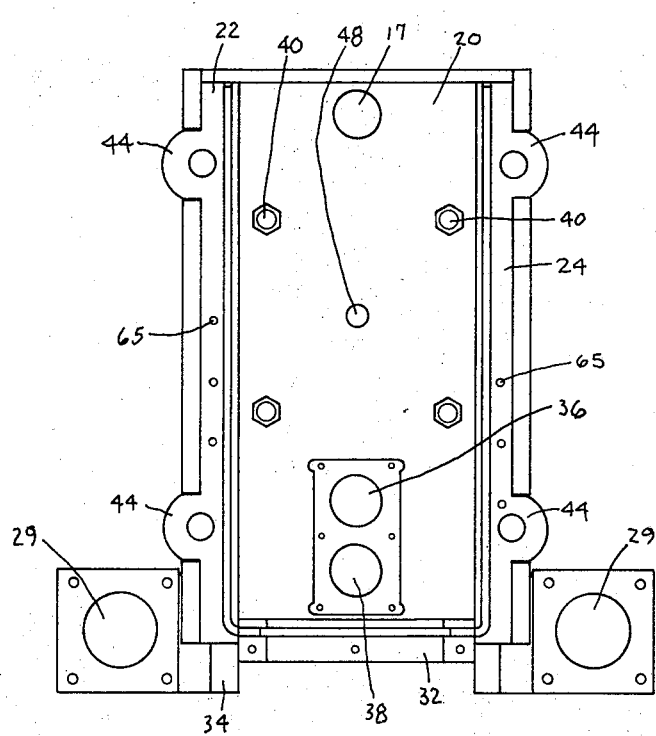
FIG. 4 is an elevational view taken along the line 4—4 of FIG. 1.

Referring to FIGS. 1 and 2 where a single portion 12 is depicted in more detail, each portion 12 comprises a carrier member 14 having cooling fluid inlet and outlet channels 16 and 18 formed therein. Each carrier 14 (FIGS. 2 and 4) comprises a sidewall 20 and front and rear walls 22 and 24 respectively. When using mold 10 with the apparatus components described in the previously mentioned copending application, a front plate extension 26 may be provided with each carrier member 14 which has protruding housing portions 28a and 28b having cylindrical passages therein within which are bearing members (not shown) for cooperation with rod supports extending through the passages on which the bearing members slide when mold sections 12 are caused to reciporcate toward and away from each other to open and close mold 10. A rear plate extension 30 is constructed similarly to 26 and cooperates with another support rod in the same manner. Brace 19 may be used to rigidify front and rear plate extensions 26 and 30. Each carrier member 14 in the illustrated embodiment is also secured, e.g., by welding, at its lower end to platform 32 having vertical member 34 at its periphery. An opening 36 (FIG. 4) tapped to accept a plug may be optionally provided in the lower end of sidewall 20 of each carrier member 14 for use when the article being molded is shorter in axial extent than that illustrated in FIG. 5, whereupon opening 38 at the end of channel 18 which is used when the size of the article is as illustrated in FIG. 5, is capped. A series of holes 40 are provided in carrier sidewall 20 for securing each carrier member 14, e.g., by bolts 41, to a support block 42 (FIG. 5) which in turn is associated with mold actuating mechanisms more fully described in our previously mentioned copending application. Ears 44 protrude from front and rear walls 22 and 24 of each carrier member within which may be situated conventional aligning pins (not shown) for entry into a cylindrical passage in an opposite ear of the other carrier member to ensure that mold portions 12a and 12b are in true alignment with each other when mold 10 is in closed, molding position. Fill opening 48, tapped to accept a threaded plug, is provided in sidewall 20 of each carrier member 14 which is used only in forming interior portions of mold 10 during its fabrication, in a manner to be more completely described hereafter. Carrier members 14 are preferably formed of a material such as titanium which has high strength, low thermal conductivity, and low weight, such physical characteristics being important when the mold is used in conjunction with a high speed mold actuating system such as that described in our copending application. It should be realized, however, that other construction materials, e.g., epoxy, fiber glass, etc. may also be used.

Each mold section 12 further comprises a thin (on the order of ¼ to 1½ inches in thickness) metal mold shell portion 50 having internal contoured surface 52 such that when mold sections 12 are closed on each other (FIG. 5) a cavity 54 is formed conforming to the shape of the article to be blown therein. In the illustrated embodiment, each shell portion 50 has an upper flange 56 having a series of spaced holes, e.g., 58, formed therein around its periphery through which conventional means such as bolts (not shown) are inserted to secure a shell portion 50 at its upper end to a carrier member. A gasket 60 should be used between the abutting surfaces of flange 56 and carrier member 14 to protect against leakage of the heat transfer liquid to the surroundings. Each mold shell portion 50 also has a protruding section 62 at its lower end below contoured surfaces 52 which, in the illustrated embodiment, has a series of holes 61 extending radially of mold center or parting line 64 at spaced points around its periphery through which means such as cap screws are inserted to secure each shell portion 50 at its lower end to the opposing wall of platform 32 beneath each carrier member 14. Gasket 66 is preferably used also in this area to protect against leakage of cooling fluid. Shell portion 50 is also secured around its periphery along face 63 with an intermediate gasket to carrier member 14 through holes 65 in walls 22 and 24.

In the illustrated embodiment, when mold 10 is in closed molding position, cavity 54 is closed at its lower end by a reciprocable plug assembly 68 situated between each mold section 12a and 12b (FIG. 5). Reciprocable section 68 is preferably used when the article being blown within cavity 54 has a raised base portion which makes it difficult to remove the formed article without crushing it unless some type of mold relieving structure is used. Assembly 78 represents such structure and is reciprocated downwardly by separate means, not shown, but disclosed in our copending application, prior to separating mold sections 12 from each other in order to allow removal of the article from the mold. It should be understood, however, that such a separate reciprocable bottom assembly is not essential and each mold shell portion 107 may be formed with its own base 70 (FIG. 7) in the more conventional manner having extension 72 secured as at 74 to base wall 76 of a carrier member 78.

Figure 3:
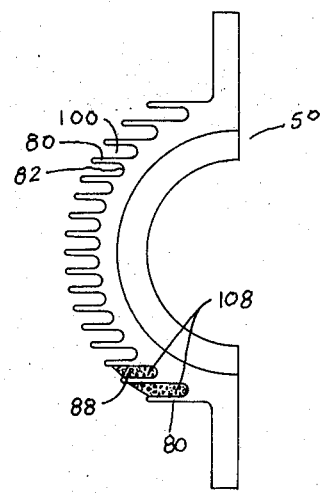
FIG. 3 is a sectional, schematic view taken along the line 3—3 of FIG. 1.
Figure 6:
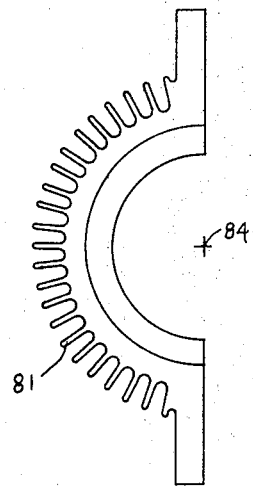
FIG. 6 is a view similar to FIG. 3 of an alternative embodiment of the invention.

Each mold shell portion 50 has a series of longitudinally disposed fins 80 (FIG. 1) which project from and extend its outer surface 82 (FIG. 3) toward sidewall 20 of the carrier member 14 in which it is secured, thus defining a groove 100 extending lengthwise of mold section 50 between adjacent fins. As illustrated in FIG. 5, it is preferred that fins 80 follow the contour of mold cavity 50 in order to keep the metal thickness between the outer (82) and inner (56) surfaces of a shell portion 50 at a minimum. Though fins 80 may be disposed in other line with respect to the mold cavity, e.g., circumferential, helical or zig-zag, the longitudinal disposition is preferred. In the embodiment of FIGS. 6, fins 81 extend radially of axis 84 of mold 10 whereas in the embodiment of FIGS. 1–5, fins 80 extend perpendicular to parting line 64 of mold 10. When the fins are formed perpendicualr to the parting lin1168 64 of the mold as in FIG. 3, a bending moment is exacted thereon when the pressure within the cavity during blowing forces the fins outwardly into backing substance 86 which is further described hereafter, and it is important that the fins be formed sufficiently thick to resist this bending moment. The radially directed alternative of FIG. 6 avoids such a bending moment but is somewhat more costly to machine and may present difficulties in forming the finished mold as more completely described hereafter. Fins 80 and 81 are preferably slightly tapered at their outer ends and are on the order of one thirty-second — three-sixteenths inch in thickness. mold shell portions 50 are preferably formed of a material having good thermal conductivity in order to rapidly extract the heat from the hot plastic expanded against interior surfaces 52 in forming the articles. Aluminum, berylium-copper alloy, kirksite etc, are such acceptable materials of construction.

Each mold section 12 further comprises a filler block portion or backing substance 86 (FIG. 5) which is frictionally engaged with the inner surfaces of side, front and rear walls 20, 22 and 24 of each carrier member 14 and with end portions 88 (FIG. 3) of each fin 80 along the full length thereof. Filler blocks 86 have an important function of supporting the relatively thin walled shells 50 with the carriers when pressure is imposed within cavity 54 during blowing. Each filler block 86 is preferably smoothly contoured upwardly as at 90 in FIG. 5 in a direction toward the upper ends of grooves 100 between fins 80 at the top of mold 10 and in a direction toward the lower ends of the grooves at the bottom of mold 10. Thus, contoured manifolds 94 (righthand section of mold 10 in FIG. 5) are formed within each mold section 12 at its upper end by surface 90 of filler block 86, surface 96 of shell portion 50 and surface 98 of carrier member 14. A similarly defined manifold 95 is formed at the lower end of section 12. These manifolds 94 and 95 communicate at their outermost ends with openings 17 and 38 in carrier member 14 (FIG. 4) and at their inner ends with the open upper ends of channels 100. Channels 100, defined by fins 80, outer surfae 82 of mold shell 50 and opposing surface 102 of filler block 86 thus serve to direct the heat transfer fluid into contact with the back side of a mold shell 50 from manifold 94 and to deliver it to discharge manifold 95. Preferably, manifold 94 smoothly decreases in cross sectional area as at 104 adjacent the ends of channels 100 to insure that the velocity and consequently the turbulence of the heat transfer medium will be at a maximum on entering grooves 100. Each filler block or backing member 86 is preferably formed of a metal having a relatively low melting point which expands on cooling. Materials such as copper and bismuth alloys serve such a purpose. Especially desirable materials are alloys comprising on a weight basis 48–55 percent bismuth, 28.5–44 percent lead, 1–14.5 percent tin and 9 percent antimony, such alloys being known as Cerromatrix, which is a registered trademark of the Cerro Copper Company and which expands on cooling at the rate of about 0.001 inch per lineal inch of material.

Figure 7:
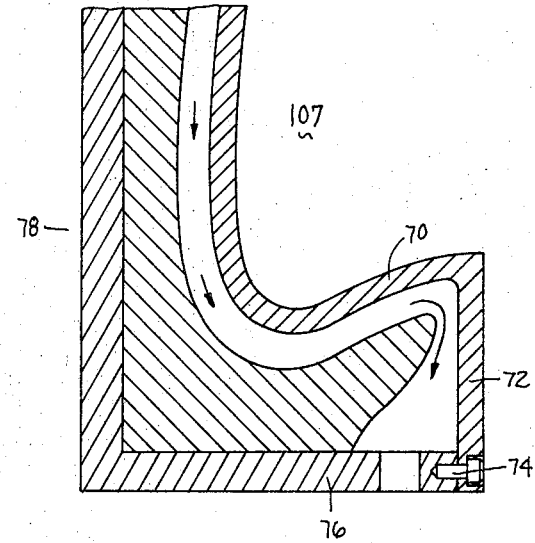
FIG. 7 is a partial, vertical, schematic view of an alternative type of mold structure embodying the present invention.

In use, after a hollow thermoplastic form is suspended between open sections 12 of mold 10 by a suitable means not shown, bottom assembly 68 is caused to reciprocate upwardly and mold sections 12 inwardly toward each other by suitable mechanisms, not shown, in order to form cavity 54. In the embodiment of FIG. 7, each mold section 107 is merely closed on the other without employing a separate upwardly reciprocating lower means. The thermoplastic at elevated temperature thus enclosed within cavity 54 is expanded outwardly against walls 52 of opposing shell portions 50 to form the article in a well known manner. To remove the heat from the thermoplastic, a suitable heat transfer medium such as ethylene glycol or water is forced from a conventional supply source, not shown, through either channel 16 to flow downwardly along grooves 100 or through channel 18 to flow upwardly through such grooves in the back of each shell portion 50. Preferably the cooling fluid enters through channel 16 at the upper end of the mold section so that it will initially contact the rear portion of the mold shell opposite that defining the reduced area neck section of the article when in the form of a bottle, since this is where the plastic has expanded the least, is the thickenset, and consequently contains the most heat. The heat transfer liquid on entering mold section 12 initially flows upwardly around the full periphery of mold shell 50, at increasing velocity through upwardly converging manifold 94, then through a throttle formed by reduced cross sectional area 104 where it is forced to cascade downwardly in a highly turbulent yet evenly distributed manner through each of the multitude of grooves 100 and thus in contact with fins 80 which extend outer or back surface 82 of each mold shell portion 50. Due to the accelerated velocity of the liquid in passing through the grooves in contact with the fins, the heat in the plastic resting agaist inner surface 52 of a mold section is rapidly extracted by the cooling fluid which empties into discharge manifold 95 and then passes out of the mold 10 through exit channel 18 back to the source of supply. After sufficient heat has been removed from the thermoplastic such that the material will not deform on being discharged from the mold, the gas used to expand the thermoplastic within the cavity is released, lower portion 68 is caused to reciprocate downwardly, and mold sections 12 to move away from each other to open mold 10 whereupon the formed article may be removed either automatically or manually.

As an important part of the present invention, a method is provided for forming each section 12 of mold 10. Since each such section 12 is formed in the same manner, fabrication of only one will be described here in detail. Initially, a shell mold made e.g., of a berylium copper alloy is cast or electro-formed in the usual manner, and preferably machined to form internal surfaces 52 and the faces of the opposing sections 12 which meet when the mold is closed. Grooves 100 are next milled or machined in the back surface of the previously formed part. In the embodiment illustrated in the drawings, (FIG. 5) grooves 100 have a somewhat smaller open cross sectional area at their upper and lower ends than along the greater part of the length of the shell portion in order to ensure that the cooling medium cascading down within the grooves during operation of the mold is at maximum velocity at either end thereof where cooling requirements are greatest. Next, forms are made for each mold section which have a predetermined outer contour corresponding to the desired shape of the inlet and outlet manifolds for feeding and discharging cooling medium from the ends of the grooves. Such forms are preferably fabricated of a material which will set fairly rapidly and which will withstand a temperature of about 200°–300° F., such as plaster of paris, and are illustrated at 106 in FIG. 5. The mold shell portion is then laid on its side and a temporary filling substance such as that illustrated at 108 in FIG. 3 placed within each groove 100 such that a substantial portion but not all of the open area of each is filled. Such a temporary filling substantially likewise can be plaster of paris.

Next, each shell mold 50 having grooves 100 substantially filled with hardened plaster of paris is assembled with its pair of filler blocks 106 in place, as indicated in the left hand section in FIG. 5, between it and a carrier member 14, such that the substantially filled grooves 100 are spaced from the inner surface of walls 20 of the carrier member and the filler blocks 106 are situated at opposite ends of the space. Backing substance 86 is then added to the partially fabricated mold section. This is accomplished by melting such substance and pouring it into the space between the mold shell and carrier through opening 48. Optionally, carrier 14 may be secured to actuating block 92 before backing substance 86 is added to the mold. A period of time is allowed to pass to permit backing substance 86 to cool and solidify and thereby tightly engage an end portion of each fin. As backing substance 86 solidifies it will expand because of its nature and consequently tightly engage exposed end portions 88 of projecting fins 80 as well as the surfaces of sidewall 20 of the carrier member and the filler blocks 106. Next, shell portion 50 is unbolted from its carrier member 14 thus exposing filler blocks 106 and the plaster of paris set within each groove 100, which is then chipped away from between fins 80 as well as from contact with backing substance 86 and carrier member 14. Each shell mold 50 is then reassembled to its solidified backing substance 86 by inserting ends 88 of the fins into the shallow depressions previously formed in the backing substance when it solidified. The shell mold is then again bolted at its upper and lower ends and sides to its carrier member in the same manner as prior to disassembly in order to provide the completely fabricated and asssmbled mold section.

As an optional feature, prior to filling grooves 100 with the plaster of paris, a slippery material such as a lubricating oil or grease may be applied to the walls of fins 80 preferably in a discontinuous manner. The plaster of paris will then stick to the surfaces of the fins at the discontinuities on solidification but will not stick at the places where the slippery material had been applied. This facilitates subsequent removal of the plaster of paris from the grooves in that the portions at the discontinuities need only be chipped away whereas those in contact with the greased surfaces will readily slide out of the grooves. With this approach difficult formation of undercuts in the fins to promote adhesion is avoided.

Alternatively, instead of initially milling grooves 100 to their full intended depth and then filling them with a temporary substance, they may be initially milled to a shallow depth prior to pouring the backing material between the carrier member and mold shell. This shallow milling would be suffficient only to form the end portion of the fins which are to be embedded in the solidified backing substance. After the backing substance 86 has been allowed to set, the assembly may be dismantled, the grooves further machined to their full depth and the components reassembled to form the finished mold. With this approach, the need for a separate filler within the grooves is avoided.

The above description and particularly the drawings are set forth for purposes of illustration only and are not to be taken in a limited sense.

The novel blow mold of the present invention optimizes mold heat removal capacity allowing rapid ejection of a formed article from the mold, consistent with the necessary characteristics of a high speed, large capacity, blow molding system. This is accomplished because of the unique manner in which the surface of the relatively thin walled shell forming the cavity in which the article is blown is extended and becomes part of a multitude of streamlined channels through which a cooling medium in turbulent flow is cascaded. The mold shell may be quite thin in thickness in spite of relatively high blowing pressures because of the sturdy support provided in firmly embedding the ends of the heat transfer fins of the shell in a rigid backing substance which itself is braced to the carrier wall. In addition, the mold is relatively lightweight in construction to permit the sections to be rapidly moved toward and away from each other without overly taxing the mold actuation mechanism.

Various modifications and alterations will be readily suggested to persons skilled in the art. It is intended, therefore, that the foregoing be considered as exemplary only and that the scope of the invention be ascertained from the following claims.

What is claimed is:

1. A mold for shaping blown hollow plastic articles which comprises:
    a. carrier members having heat transfer fluid inlet and outlet openings;
    b. mold shell portions secured to the carrier members having interior surfaces forming a cavity conforming to the shape of said articles when the mold is in closed position, each shell portion having fins projecting from its outer surface toward the carrier member in which it is secured;
    c. a filler block engaged with wall portions of each carrier member and end portions of the fins thus forming with said fins channels for passage of the heat transfer fluid therethrough, said filler blocks forming contoured manifolds communicating with the openings in said carrier members and with the ends of said channels for directing the heat transfer fluid to and removing it from opposite ends of said channels.

2. The mold of claim 1 wherein said channels follow the contour of the mold cavity.

3. The mold of claim 1 wherein the cross sectional area of the manifolds at the feed end of the channels is less than the uptream cross sectional area thereof.

4. The mold of claim 1 wherein said fins are longitudinally disposed and extend substantially perpendicular to the parting line of the mold.

5. The mold of claim 1 wherein said fins extend radial to the axis of the mold cavity.

6. The mold of claim 1 wherein the filler comprises on a weight basis 48–55 percent bismuth, 28.5–44 percent lead, 1–14.5 percent tin and 9 percent antimony.

7. The mold of claim 1 including gasket members between the carriers and mold shell portions.

8. A mold for shaping blown hollow plastic articles which comprises:
   a. carrier members having cooling fluid inlet and outlet openings;
   b. thin metal mold shell portions secured to the carrier members having interior contoured surfaces conforming to the shape of said artcles when the mold is in closed position, each shell portion having loitudinally disposed fins following the contour of the mold cavity projecting from its outer surface toward the walls of the carrier member in which it is secured; and
   c. a metal aloy filler block frictionally engaged with wall portions of each carrier member and with end portions of the fins along the length thereof thus forming channels with said fins for passage of a cooling medium therethrough to reduce the temperature of the cavity surface.

9. The mold of claim 8 wherein said alloy forms contoured manifolds with surfaces of the shell portions and the walls of the carrier members which communicate with the openings in the carrier members and with the open ends of the channels for selectively directing the flow of a cooling medium to and from said channels.

10. The mold of claim 8 wherein each carrier member has a separate opening with a removable cap for said metal alloy when in liquid form.

11. The mold of claim 8 wherein the mold shell portions are formed of a metal having good thermal conductivity and the carrier members are formed of a metal having poor thermal conductivity relative to that of the shell portions.

* * * * *